(12) United States Patent
Landrum et al.

(10) Patent No.: US 7,712,599 B1
(45) Date of Patent: May 11, 2010

(54) IN-LINE CARTON FEEDING AND FORMING MACHINE WITH CARTON LUG CONVEYOR AND RELATED METHODS

(75) Inventors: Charles Ray Landrum, Dunwoody, GA (US); Urs Reuteler, Atlanta, GA (US)

(73) Assignee: Kliklok Corporation, Decatur, GA (US)

(*) Notice: Subject to any disclaimer, the term of this patent is extended or adjusted under 35 U.S.C. 154(b) by 556 days.

(21) Appl. No.: 11/562,087

(22) Filed: Nov. 21, 2006

(51) Int. Cl.
*B65G 47/24* (2006.01)
(52) U.S. Cl. .................................. 198/415; 198/411
(58) Field of Classification Search ............. 198/415, 198/698, 728, 411
See application file for complete search history.

(56) References Cited

U.S. PATENT DOCUMENTS

| | | | |
|---|---|---|---|
| 907,116 A | 12/1908 | Baker | |
| 2,356,120 A | 8/1944 | Slightam | |
| 2,761,542 A | 9/1956 | Pagdin | |
| 2,937,553 A | 5/1960 | Sherman | |
| 2,984,332 A * | 5/1961 | Pierce, Jr. | 198/415 |
| 3,256,973 A * | 6/1966 | Gonski | 198/727 |
| 3,267,637 A * | 8/1966 | Baker | 53/484 |
| 3,321,062 A | 5/1967 | Brockmuller at al. | |
| 3,332,531 A | 7/1967 | Chaney | |
| 3,432,023 A | 3/1969 | Lucas | |
| 3,475,936 A * | 11/1969 | Steele | 72/53 |
| 3,580,379 A | 5/1971 | Shuster | |
| 3,890,763 A | 6/1975 | Ullman | |
| 4,085,839 A | 4/1978 | Crawford | |
| 4,086,744 A | 5/1978 | Seragnoli | |
| 4,365,456 A | 12/1982 | Ullman | |
| 4,417,653 A | 11/1983 | Zwezerynen | |
| 4,471,865 A | 9/1984 | Johnson | |
| 4,476,972 A | 10/1984 | Bryson | |
| 4,499,990 A | 2/1985 | Fishback | |
| 4,672,792 A | 6/1987 | Wallin | |
| 4,807,739 A | 2/1989 | Wolf et al. | |
| 4,901,842 A | 2/1990 | Lemboke et al. | |
| 4,967,899 A | 11/1990 | Newsome | |
| 5,038,913 A | 8/1991 | Kramer | |
| 5,188,211 A | 2/1993 | Ringot et al. | |
| 5,316,123 A | 5/1994 | Achelpohl | |
| 5,343,998 A | 9/1994 | Depinet et al. | |
| 5,518,103 A | 5/1996 | Achelpohl et al. | |
| 5,660,262 A | 8/1997 | Landrum et al. | |
| 5,774,634 A * | 6/1998 | Honma et al. | 358/1.9 |
| 6,032,782 A | 3/2000 | Sampson | |
| 6,935,484 B2 | 8/2005 | Davis et al. | |

* cited by examiner

*Primary Examiner*—Gene Crawford
*Assistant Examiner*—Kavel P Singh
(74) *Attorney, Agent, or Firm*—King & Schickli, PLLC

(57) ABSTRACT

In a machine for feeding a partially formed carton in a conveying direction and reorienting the carton for completion, a turn-assist mechanism and related methods help to ensure that proper turning of a skewed carton is achieved in a reliable and highly efficient manner. The mechanism comprises a bed for supporting the carton, which may be skewed from a first orientation in which one of the side flaps could be folded and sealed in an upstream procedure. A conveyor includes at least one lug with a portion generally elongated in a direction transverse to the conveying and vertical directions for engaging a trailing end of the carton. This engagement helps to turn the carton to a second, squared orientation approximately 90° rotated from the first orientation so that the forming operation may be completed, such as by folding and sealing any other side flaps.

29 Claims, 14 Drawing Sheets

IN-LINE CARTON FEEDING AND FORMING MACHINE WITH CARTON LUG CONVEYOR AND RELATED METHODS

FIELD OF THE INVENTION

The present invention relates to the carton feeding and forming art and, more particularly, to a machine and related methods for feeding and forming a carton.

BACKGROUND OF THE INVENTION

Machines for feeding and closing partially formed and filled cartons are well-known in the art. For many years, the most successful approach for feeding cartons along an entire carton forming line, including for closing and sealing the lid and flaps, was performed by conveyors in-line with fixed lugs or flights mounted on chains, as shown in U.S. Pat. No. 3,267,637 to Baker, which is incorporated herein by reference. These chains moved the cartons forward by pushing along the rear or trailing end. At various transition locations along the carton forming line, it was necessary to turn the carton about its vertical axis while continuing to feed the carton forward. Usually, this turning motion was through 90 degrees and was performed in one fashion or another, such as by using a plurality of spaced belts running at different speeds, a kick-out mechanism, or the like.

A modern and commercially successful approach to continuous carton forming is found in commonly assigned U.S. Pat. No. 5,660,262 to Landrum et al., the disclosure of which is also incorporated herein by reference. In this arrangement, infeed belts frictionally engage the top and bottom surfaces of the carton for conveying while the front flap is sealed. This eliminates the need for pre-folding the trailing end flap to avoid damaging it, as is required when using upstanding lugs. After the front flap is sealed, the carton enters a zone with a kick-out lug to engage a leading side of the carton, retard its motion and cause it to start to turn. A plurality of spaced parallel belts running at different speeds then continue to reorient the carton, such as with turning through 90° in the same plane. The turned carton is then received and conveyed by spaced belts while the opposite side flaps are folded and sealed. The carton is thus formed in a continuous fashion without stopping or changing the conveying direction.

While this type of approach has enjoyed considerable commercial success, the use of belts running at differential speeds to turn the carton during feeding increases the complexity of the machine, as well as the resulting footprint. Maintenance costs are also increased in view of the need for ensuring that the speed of the belts is proper for turning the carton in the desired fashion. Modern times also demand faster throughput than can be afforded using frictional engagement alone to accomplish turning.

Accordingly, a need exists for an improved carton feeding and forming machine that overcomes the foregoing limitations and others.

SUMMARY OF THE INVENTION

In accordance with a first aspect of the invention, a machine for conveying a carton along a path in a conveying direction with turning from a first orientation to a second orientation is disclosed. The machine comprises a first conveyor for at least partially turning the carton from the first orientation to a skewed orientation. The machine further includes a second conveyor having at least one lug with a portion having a direction of elongation transverse to the conveying and vertical directions for engaging a trailing end of the carton in the skewed orientation. As a result, the engagement by the elongated portion of the at least one lug with the trailing end helps to turn the carton from the skewed orientation to the second orientation.

In one embodiment, the first conveyor includes at least one lug for engaging the trailing end of the carton being conveyed in concert with the at least one lug of the second conveyor. More preferably, the first conveyor includes first and second lugs for simultaneously engaging the trailing end of the carton in the first orientation. Most preferably, the first conveyor comprises a first lug for engaging the trailing end adjacent one side of the carton being conveyed over a bed and a second lug for engaging the trailing end adjacent another side of the carton, including after the first lug withdraws from engagement with the trailing end, on account of the fact that each of the adjacent lug conveyors has a different length in the conveying direction.

In yet another preferred embodiment, the lug of the second conveyor is generally T-shaped. During actuation to a position for engaging the carton, the elongated portion passes through a transverse opening in a bed along which the carton is conveyed. Also preferable is to retract the lug by passing the elongated portion through a second opening in the bed downstream of the first opening in the conveying direction. Optionally, the machine may further include a friction wheel for contacting the carton at least partially during the turning from the first orientation to the second orientation.

In accordance with another aspect of the invention, a mechanism is provided for use in a carton feeding and forming machine. The mechanism is for assisting in turning the carton moving along a conveying path from a first, skewed orientation relative to a conveying direction to a second orientation, and comprises a bed for supporting the carton and a first conveyor for advancing and turning the carton. Specifically, the first conveyor includes at least one lug for advancing the carton along the conveying path, the lug having a portion elongated in a direction transverse to the conveying and vertical directions for engaging a trailing end of the carton in the first orientation. Consequently, the engagement with the lug helps to turn the carton from the first orientation to the second orientation.

Preferably, the at least one lug comprises a selectively actuatable lug that, during actuation, passes through an opening in the bed. Likewise, it is preferable that the lug retracts by passing through a second opening in the bed downstream of the first opening in the conveying direction. In any case, the lug preferably also comprises a generally T-shaped head including the elongated portion, and the bed preferably lies entirely above the first conveyor.

In one particularly preferred embodiment of the mechanism, a second conveyor is provided for operating in concert with the first conveyor. This second conveyor includes a first, retractable lug for engaging the trailing end adjacent one side of the carton being conveyed and a second lug for engaging the trailing end adjacent another side of the carton, including after the first lug retracts and in concert with the at least one lug of the first conveyor.

In accordance with yet another aspect of the invention, a method for conveying a carton along a path in a conveying direction with turning from a first orientation to a second orientation is disclosed. The method comprises at least partially turning the carton from the first orientation to a skewed orientation. The method further comprises turning the carton from the skewed orientation to the second orientation using a first lug having a portion with a direction of elongation transverse to the conveying and vertical directions for engaging a trailing end of the carton.

Preferably, the step of at least partially turning the carton from the first orientation to the skewed orientation comprises engaging the carton with at least one lug. In the situation that a bed is provided along which the carton passes, the step of turning the carton from the skewed orientation to the second orientation further is accomplished by passing the lug through at least one opening in the bed. The method may further include the step of frictionally engaging the carton during the turning from the first orientation to the skewed orientation.

In a particularly preferred embodiment, the turning method comprises engaging the trailing end of the carton adjacent one side of the carton being conveyed with a second lug. The method further comprises engaging the trailing end of the carton adjacent another side of the carton with a third lug. One of the second or third lugs is retracted while continuing to advance the carton with the other and in concert with the first lug so as to effect turning from the first orientation to the second orientation.

BRIEF DESCRIPTION OF THE DRAWING FIGURES

DESCRIPTION OF THE INVENTION

Figure 1:
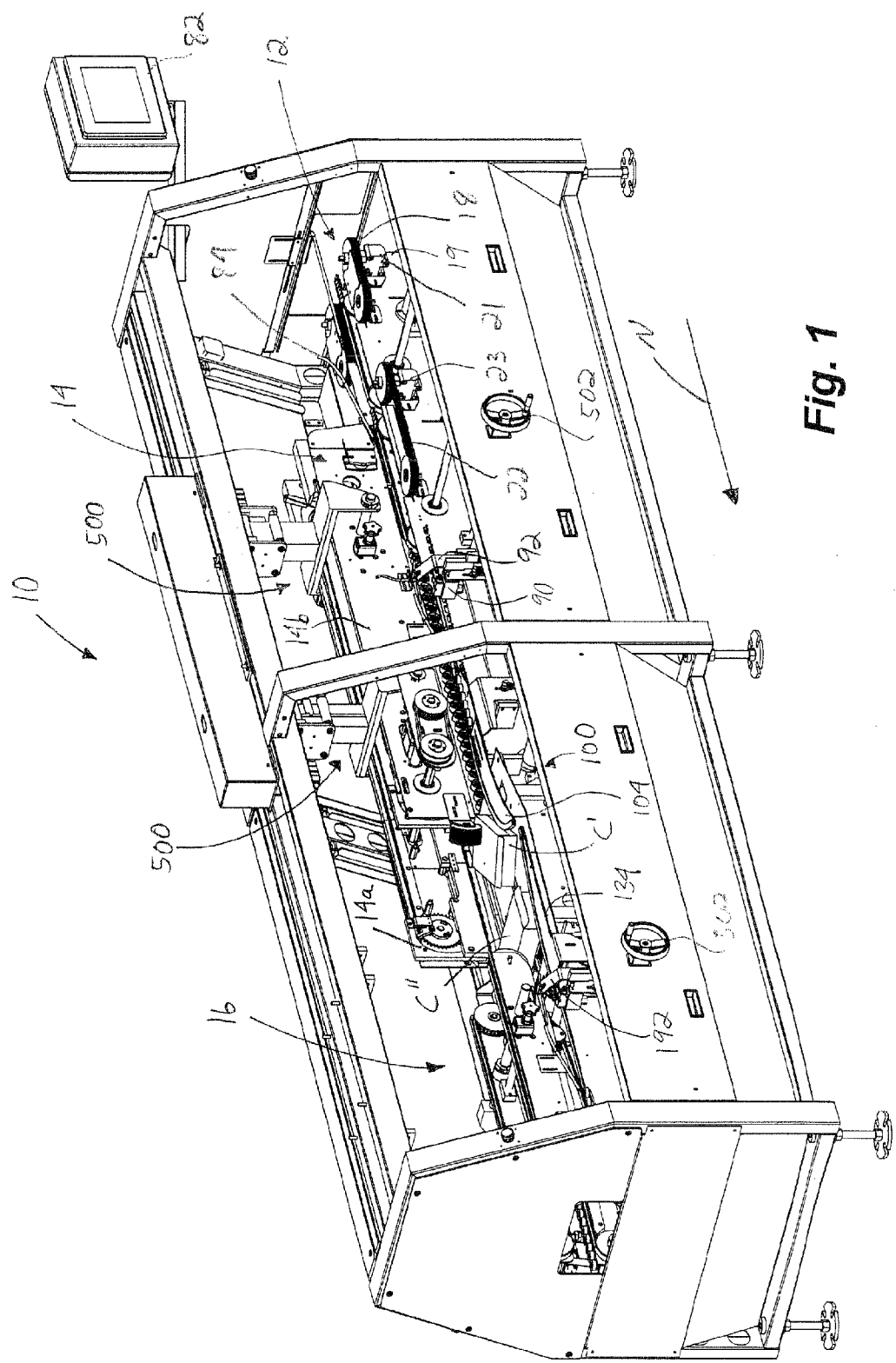
FIG. 1 is an overall perspective view of one embodiment of a carton forming and feeding machine forming one aspect of the invention.

Reference is now made to FIGS. 1-10 of the drawings, which together help to describe and illustrate one possible embodiment of the carton forming and feeding machine 10 forming one aspect of the present invention. Making reference now to FIG. 1, an overall perspective view of an exemplary embodiment of the carton forming and feeding machine 10 is shown. In the illustrated embodiment, and as perhaps best understood with combined reference to FIG. 2, the machine 10 includes an infeed conveyor 12, a takeaway conveyor 16, and an intermediate conveyor 14 between the two conveyors 12, 16. These conveyors 12, 14, 16 are all "in-line" and thus together define a substantially horizontal conveying or flow path for objects being conveyed in a conveying direction N.

The machine 10 of the present invention is particularly useful in a cartoning line for the top-loaded style of cartons C including a plurality of flaps. For example, the carton C may have a lid I or closure having a front flap $F_1$ and generally opposed side flaps $F_2$, $F_3$ (see FIG. 2) with hinges defined by score or fold lines. A carton C of this type may be formed from a blank by an upstream forming apparatus (not shown, but see for example commonly assigned U.S. Pat. No. 5,177,930 to Harston et al., the disclosure of which is incorporated herein by reference). In the typical arrangement, the carton C with the lid I in an open position is filled with product while traveling between the forming apparatus and the infeed conveyor 12 of the machine 10, which as outlined further below that completes the filled carton by folding and sealing the lid I.

Figure 2:
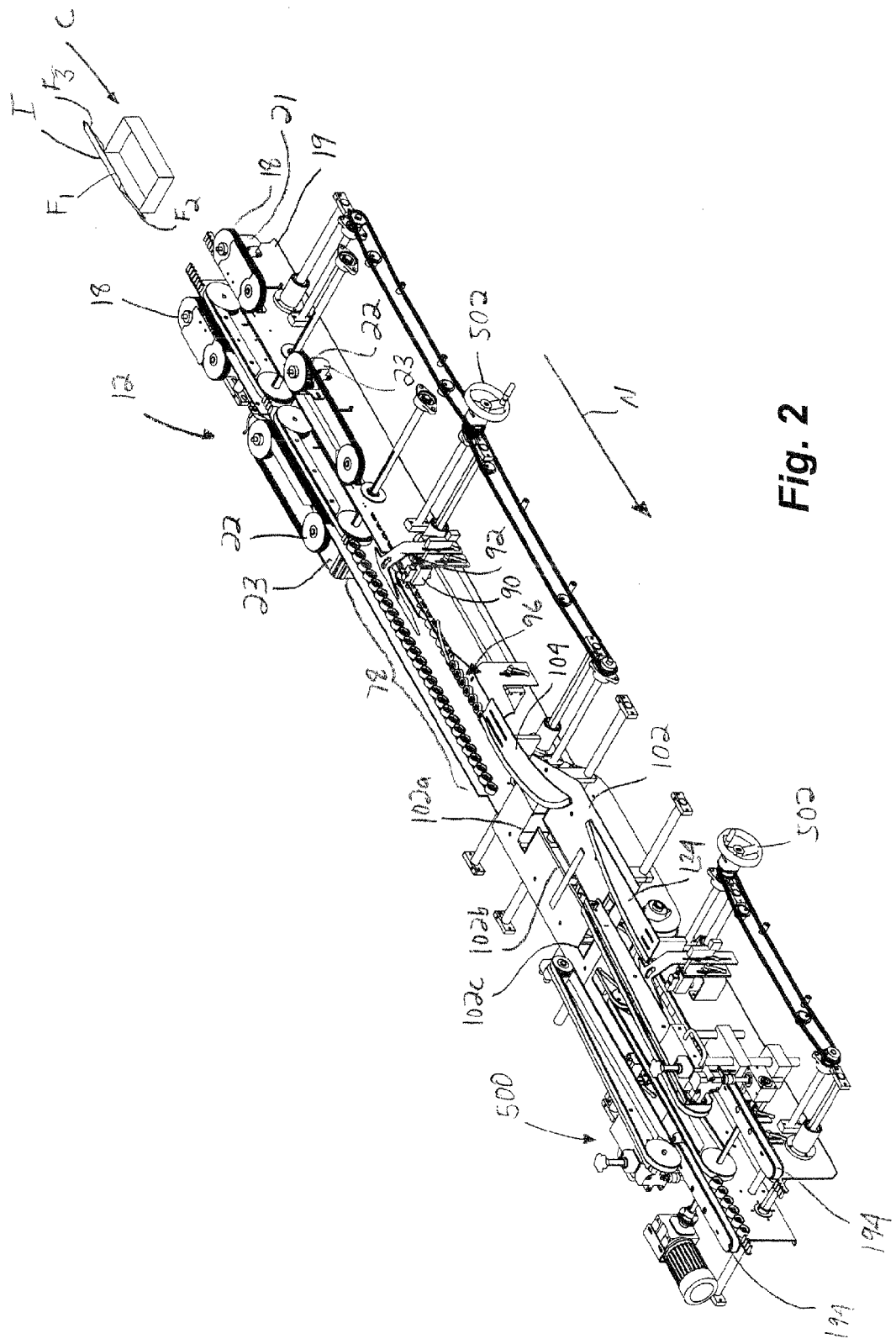
FIG. 2 is a perspective, partially cutaway view of the machine of FIG. 1.

As perhaps best shown in FIG. 2, the infeed conveyor 12 in the illustrated embodiment includes a metering device at one end comprising one or more pairs of spaced belts 18. The preferable arrangement is to provide pairs of belts 18 along the side, as well as along the bottom of the carton conveying path. These belts 18 may be independently supported by first and second spaced frame members 19 of the machine 10, and serve to initially receive and engage the corresponding sides of the carton C. The belts 18 may be driven in an endless path over corresponding drive and idler pulleys (not numbered) by one or more variable speed drives (e.g., variable frequency drives (VFD) or motors 21).

In one anticipated arrangement, the feed of partially formed and filled cartons to the machine 10 is random. Belt conveyors 22 downstream of the infeed belts 18 then accelerate the randomly received cartons such that each travels at a known, substantially constant speed upon encountering the intermediate conveyor 14. As should be appreciated, this acceleration also helps to create a desirable minimum gap with the next-in-line carton (which gap may be made smaller than usual in the present machine 10, as will be understood from reviewing the remaining description). To crease this acceleration, this set of belt conveyors 22 may be independently driven one or more motors 23 (which likewise may comprise a servomotor or variably frequency drive). The use of independent sets of motors 21, 23 of course allows for driving the belt conveyors 18, 22 at different speeds, as desired for a particular throughput or mode of operation. Regulation of the speed of the various motors and other aspects of the machine 10 may be effected by an onboard computer or like logic device programmed to serve as a controller.

Figure 3:
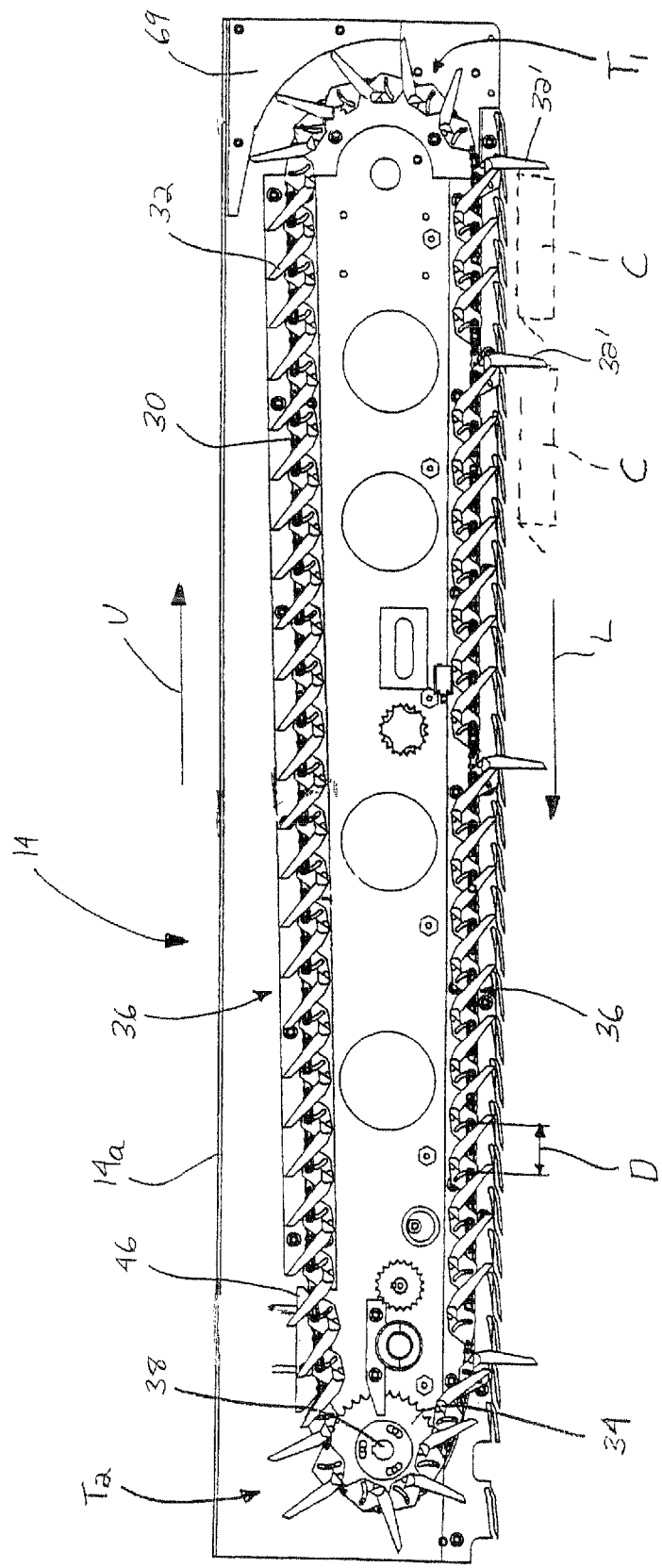
FIG. 3 is a side view of an overhead lug conveyor.

With reference to FIG. 3, one possible construction of the intermediate conveyor 14 for receiving the cartons from the infeed conveyor 12 and conveying them in or along a substantially horizontal path in a first direction is now described in detail. In the illustrated embodiment, the intermediate conveyor 14 is comprised of a pair of spaced, generally parallel lug conveyors 14a, 14b (front and rear when the machine 10 is in the orientation shown in FIG. 1) that overlie and partially define the conveying path. As perhaps best shown in FIG. 3, each lug conveyor 14a or 14b (only one conveyor 14a shown) includes a chain 30 driven in an endless path along a forward or lower run (action arrow L) and a return or upper run (action arrow U), with first and second transitions $T_1$, $T_2$ between the runs U, L. Each chain 30 carries a plurality of extensible lugs 32 that, as described in more detail below, may be selectively actuated from a retracted or normal position to a depending (or "pop-down") actuated position at a desired instant in time for engaging and conveying the partially folded and formed cartons received from the infeed conveyor 12.

More specifically describing the lug conveyors 14a, 14b, each includes a drive sprocket 34 for engaging and driving the corresponding chain 30 along an endless path defined by a guide track 36. Preferably, the sprocket 34 of each lug conveyor 14a, 14b is mounted on a common shaft 38 and gang-driven by a common motive device or third motor (not shown). Consequently, each chain 30 is moved along the endless path at substantially the same speed. The chains 30 may be conventional link chains, which may optionally include friction-reducing rollers.

Figure 4A:
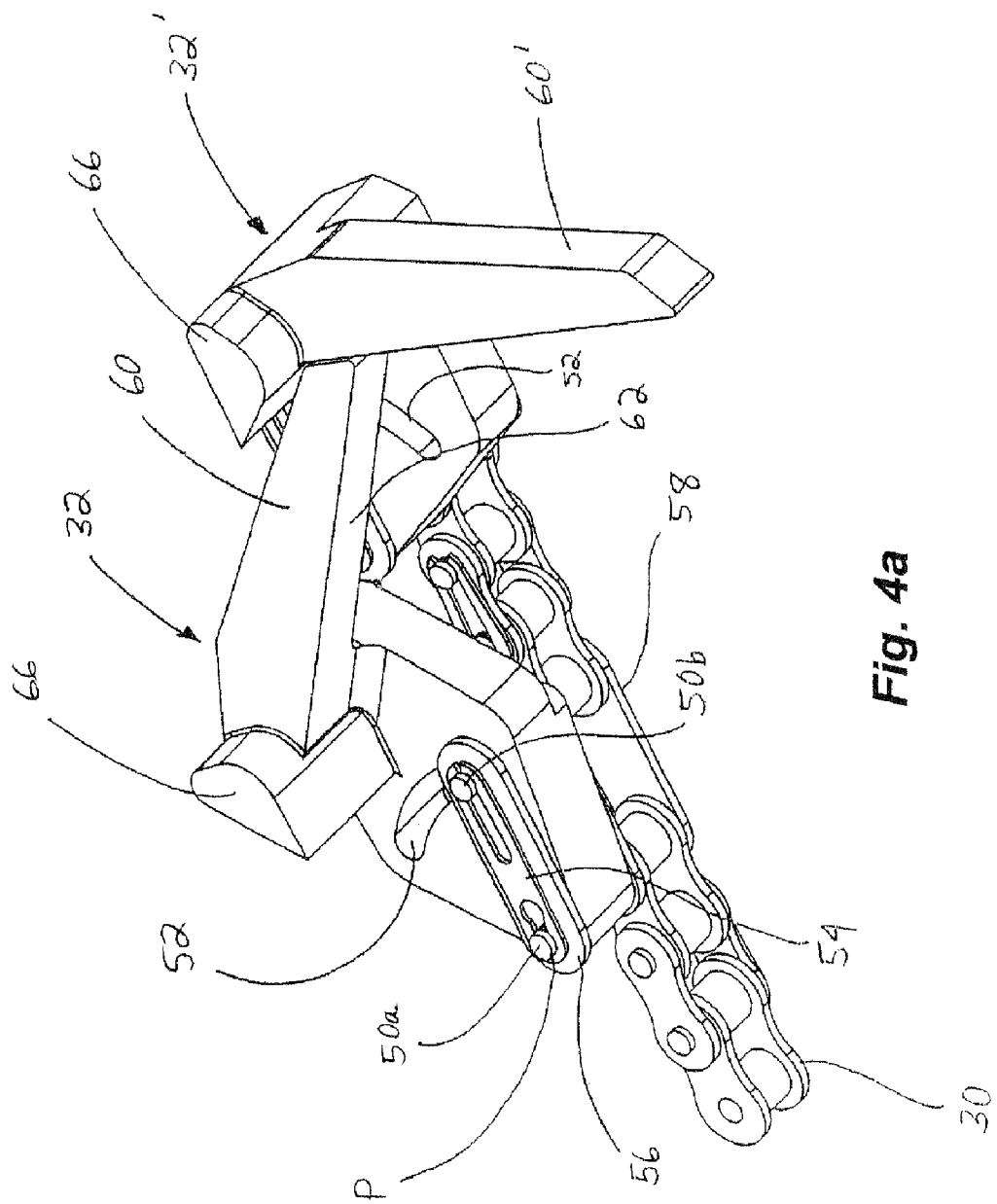
FIG. 4a is a bottom perspective view of a pair of lugs for possible use with the conveyor of FIG. 3.
Figure 4B:
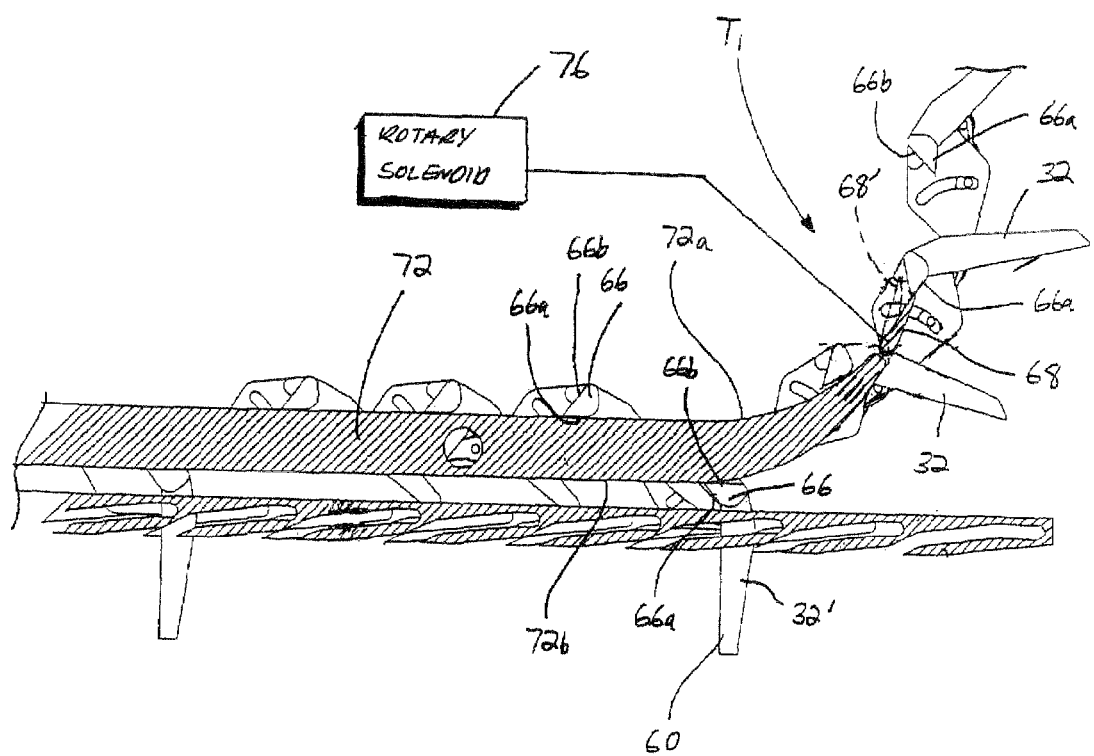
FIG. 4b is a partially schematic side view showing one possible manner of lug actuation.
Figure 4C:
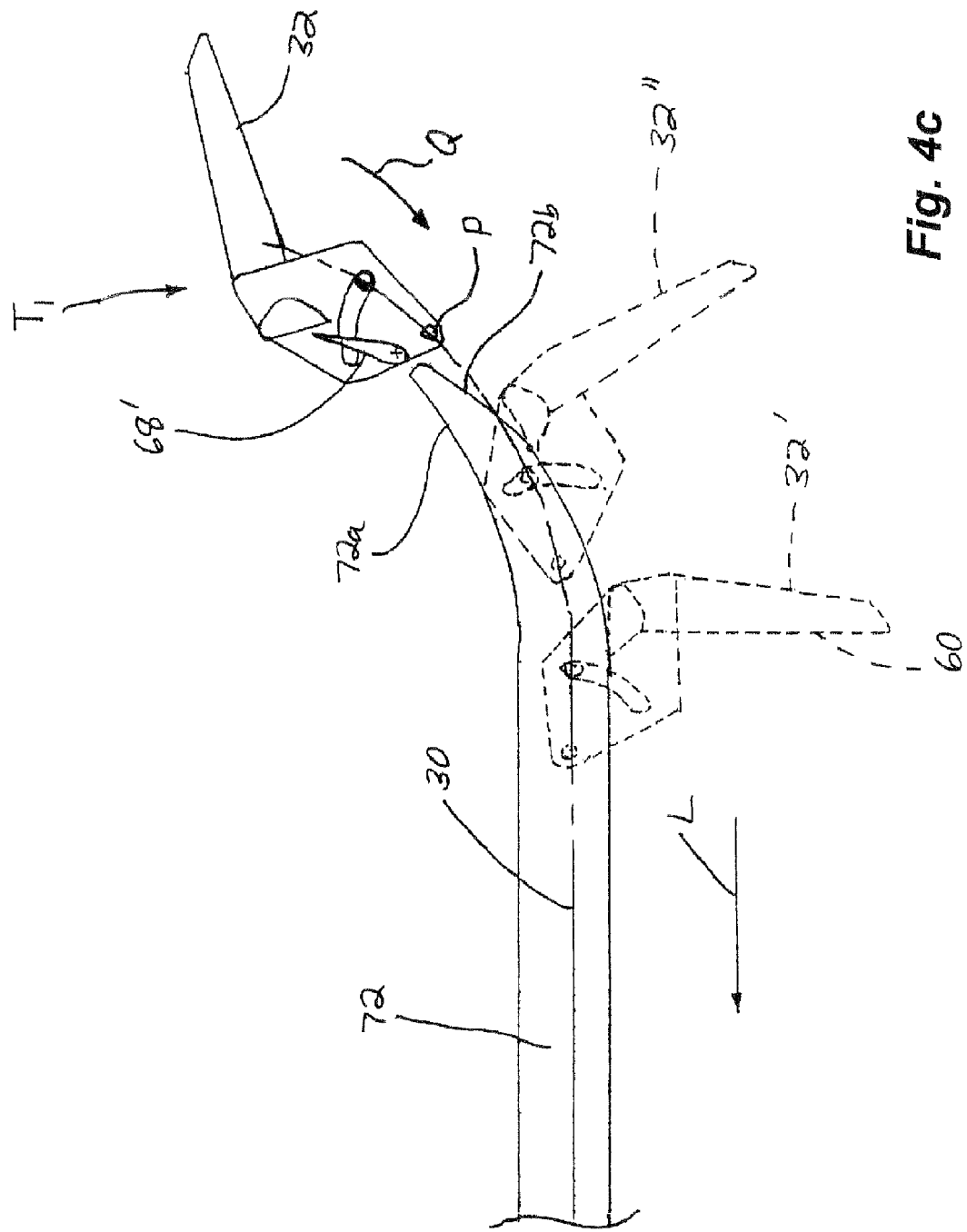
FIG. 4c is a side view similar to FIG. 4b.

With reference now to FIGS. 4a-4c, the manner in which selected lugs 32 associated with the chains 30 of the conveyors 14a, 14b are simultaneously pivoted or moved to the actuated or depending position (32') for engaging and conveying an object, such as a carton, is now described in detail. Turning first to the bottom perspective view of FIG. 4a, each lug 32 is mounted to and carried by the chain 30 such that it is capable of pivoting movement. For example, a pair of pins 50a, 50b may extend transversely from the chain 30 at selected intervals. A first one of the pins 50a passes through a hole (not shown) formed at one end of the lug 32 and the second pin 50b passes through a generally arcuate slot 52 formed in the body of the lug 32. A removable locking retainer 54 holds a plate-like bearing 56 against the outer surface of the lug 32, and a corresponding elongated connector 58 is provided for interconnecting the links (not numbered) along the opposite side of the chain 30.

As a result of this arrangement of structures, each lug 32 may freely pivot or rotate about the pivot point P (clockwise in the view of FIG. 4c; note action arrow Q) defined by the first pin 50a and travel along an arcuate path defined by the slot 52. Thus, a point on the surface of the lug 32 during pivoting is considered to follow an arcuate path. Preferably, when the lug 32 is in the retracted or "laid-back" position, as is the leading lug in FIG. 4a, the pin 50a is at the lower end of the slot 52. In this position, a projecting pusher 60 of the lug 32 remains withdrawn from the adjacent path of conveyance (see FIG. 3) such that it forms an acute angle with the horizontal plane. In contrast, when the lug 32 is in the actuated or depending position, like the trailing lug 32' in FIG. 4a, the second pin 50b is at the opposite end of the slot 52. Consequently, the pusher 60 extends into the conveying path for engaging the carton, and is generally perpendicular to the horizontal plane.

In the illustrated embodiment, the lugs 32 are oriented such that, when the associated pusher 60 is in the actuated position, the generally planar engagement face 62 is presented for engaging and pushing the carton along a trailing end (which with the trailing end flap $F_3$ in the folded condition is generally planar). However, as noted further in the description that follows, the lugs 32 could also be oriented such that the engagement face 62 of the pusher 60 contacts the carton along the leading end (and may thus be used to provide a squaring function as the carton is pushed along by either a belt conveyor or a bottom-running lug conveyor, or to hold the carton back while a pop-down lug is used to engage and fold an associated flap). A combination of the two approaches could also be used, either on the same conveyor in the case of lugs spaced far apart or different conveyors in the case of overlapping lugs. In either case, the engagement face 62 is preferably perpendicular to the horizontal plane when the lug 32 is actuated.

With reference again to FIG. 4a, each lug 32 includes a transversely extending projection or tab 66. Preferably, each tab 66 is specially contoured to include a first sloping or inclined leading face 66a for engaging a first surface of a diverter, such as a pivotally mounted finger 68. In the illustrated embodiment, the finger 68 is tapered and elongated in the conveying direction. The finger 68 may project from an elongated support structure 70 positioned adjacent to the conveyor 14a and, more particularly, along the lower run L thereof.

When in the home position as shown in FIG. 4b, a first side of the finger 68 may engage the leading face 66a of the tab 66 extending from each lug 32. This guides it into engagement with a first surface 72a of a guide structure 72 supported by the support member 70 and also forming part of the diverter. As a result, the corresponding lug 32 is maintained in the retracted position as it travels along with the chain 30. In this position, the elongated pusher 60 is incapable of engaging a carton in the conveying path by virtue of the captured nature of the corresponding tab 66.

When actuation of a particular lug 32 is desired, such as for engaging a portion of a stationary or fleeting carton adjacent to the conveyor(s) 14a, 14b, the finger 68 is pivoted (counterclockwise in FIGS. 4b and 4c to position 68') to engage an different surface 66b of the corresponding tab 66. The pivoting movement may be provided by a corresponding motive device, such as a rotary solenoid 76, the actuation of which is controlled by the controller. Preferably, the pivoting is momentary and through a small angular range (e.g., a few degrees in the counterclockwise direction). As a result, only the transverse tab 66 of a single selected lug 32 is engaged but the projection of the next-in-line lug is not (even when the chains 30 are moving at high speeds; e.g., greater than 1 ft/s).

Initially, the engagement with the finger 68 in the actuated position causes the selected lug 32 to begin the pivoting sequence, such as by moving from a retracted position to approximately 10° pivoted (that is, the second pin 50b travels approximately 10° along the arc defined by the slot 52). The finger 68 when actuated guides the tab 66a into engagement with a second, adjacent engagement surface 72b at the upstream end of the guide structure 72, which is also considered to be located in or along the transition $T_1$ from the return run to the forward run. The portion of the engagement surface 72b at the upstream end of the guide structure 72 by the transition $T_1$ is curved or specially contoured such that the partially pivoted lug 32 moves to a more fully pivoted position (note phantom position 32" in FIG. 4c) and ultimately to a fully pivoted position (position 32' in FIGS. 4b and 4c), with the elongated pusher 60 now fully depending and ready to engage a portion of a carton or other object on an adjacent support surface (such as a dead plate, a conveyor, a pair of spaced guide rails, etc.). With the partial pivoting created by the engagement with the finger 68, the total range of movement of the lug 32 in the preferred embodiment is about 60° (which means that the slot 52 defines an arc of about the same angle). This actuation sequence performed along the transition $T_1$ helps to reduce the amount of gap required between successive cartons. Positive engagement with the continuous guide surface 72b also ensures that the actuated lug 32' remains in position and prevents inadvertent retraction.

An optional guide structure 69 with a curved engagement face may also extend at least partially along the transition $T_1$ from the return or upper run U to the forward or lower run L. The engagement between the tip of the pusher 60 and the curved face of this guide structure 69 helps to resist the centrifugal and gravitational forces that tend to rotate each lug 32 toward the infeed end as it moves through the transition $T_1$. This in turn helps to ensure that the transverse tab 66 remains in the desired position for engaging the corresponding surface of the finger 68 such that it reaches the desired surface 72a, 72b of the guide structure 72.

With reference back to FIG. 3, the lug conveyors 14a or 14b used in the preferred embodiment of the machine 10 include closely spaced lugs 32. In the most preferred embodiment, the distance D from a point on any leading lug, such as the center, to the corresponding point on the next-adjacent trailing lug in the retracted or normal position (commonly referred to as the "pitch") is about 2.5 inches. In this embodiment, this distance D is less than the width of each lug in the conveying direction (such that about 4.8 lugs in the normal position are provided for each foot of chain 30). Consequently, the leading and trailing lugs 32 fully overlap with one another, even in the retracted normal condition. Preferably, the overlap occurs in the conveying direction (parallel to action arrow L in FIG. 3) or a direction generally transverse to the conveying direction and the vertical direction (e.g., perpendicular to action arrow L and in the same horizontal plane), depending on the orientation of the lugs 32. In other words, a trailing part of each leading lug (such as the pusher 60) at least partially covers a leading part of each trailing lug, both along the upper and lower runs U, L.

This close spacing provides the lug conveyors 14a, 14b with the ability to vary the pitch of the actuated lugs 32'. Consequently, when the chains 30 move at high rates of speed, the lugs 32 are essentially infinitely actuatable at a desired instant in time at any location along the endless path where the diverter (finger 68) is positioned. By positioning the diverter at the transition $T_1$ to the forward run, an adjacent carton may be engaged and conveyed at the point of introduction without the need for precisely timing the infeed to ensure that a smooth, uninterrupted operation is maintained. Even in the situation where the cartons are randomly fed, the ability to selectively actuate the lugs (and thus vary the pitch of the actuated lugs on the chain 30) reduces the time between the carton reaching the position for conveyance and the actual engagement event. A significant increase in throughput is therefore possible with enhanced reliability. Advantageously, the use of pusher lugs 32 also avoids the possible skewing created when the carton is conveyed via frictional engagement with top and bottom-running belts.

One possible mode of operation of the machine 10 is to deliver the partially formed cartons to a stable support surface, such as a pair of spaced, elongated support rails (not shown) or closely spaced rollers 78 (see FIG. 2), positioned adjacent to the intermediate conveyor 14 and along the conveying path. The partially formed carton C may be introduced at a constant speed using the belts 22, with the leading end detected by adjacent position sensor (but which may comprise a photo-electric, through-beam type sensor with an opposed transmitter and receiver). Based on the known dimensions of the carton (which may be inputted by the operator to the controller via an interface such as a touch screen 82; see FIG. 1), the known position of the leading end (as determined by sensor, which may generate a corresponding output signal), and the known speed of travel of the carton (as determined by the belts 22, and adjustable depending on the desired throughput), the finger 68 may be actuated at the desired instant in time such that a single lug 32 of each conveyor 14a, 14b assumes the actuated or depending position to engage and convey the carton. The selective actuation of the lugs by the finger 68 along the transition $T_1$ ensures that only the selected lug is engaged just in time for engaging the carton (which is spaced from the next-in-line carton by the metering belts 18 and 22) in the desired fashion. The operation is thus smooth and efficient, which allows for an increase in throughput without a concomitant increase in downtime to clear deleterious jams.

In the typical arrangement, the partially formed and filled carton C is introduced to the machine 10 with the lid I or closure in an open state and the flaps unfolded, as shown in FIG. 2. Consequently, as the carton enters the machine 10, the lid I must be moved toward the closed position in order to allow for the folding and sealing of the associated flaps. In one possible embodiment, and as perhaps best shown in FIG. 1, the closing is accomplished by a static plow 84 for engaging the generally vertically oriented lid I and automatically folding it as the carton C approaches the intermediate conveyor 14. When the lid I is closed, a first side flap $F_2$ of the carton C remains unfolded along the leading end and the second side flap $F_3$ remains unfolded along the trailing end. In this orientation, the front side flap $F_1$ faces the front of the machine 10 as it appears in FIG. 2. This is known as a "narrow end" leading configuration (that is, the narrower lateral side of the rectangular carton is the leading or front end). However, it should be appreciated that the converse configuration may also be used in cartons where the side flaps are on the elongated sides of the carton (although an adjustment in the spacing of the lug conveyors 14a, 14b may be necessary). Likewise, use of the machine is not limited to only rectangular cartons, although this is the most common form used.

Engaging the carton with the trailing end flap $F_3$ in the unfolded or open condition using lugs 32 is undesirable in most instances, since damage may result. To avoid this situation, the trailing end flap $F_3$ of each carton introduced to the machine 10 may be at least partially pre-folded before being engaged by the lugs 32. In the illustrated embodiment, the pre-folding or partial closing of this flap $F_3$ is accomplished using at least one rotatable "pre-folding" wheel 86 including one or more radially extending projections. The projections thus form fingers or paddles 88 adapted for engaging the trailing end flap $F_3$ (FIGS. 5a-5e).

As illustrated, this pre-folding wheel 86 is preferably positioned between the lug conveyors 14a, 14b such that when it is rotated, a paddle 88 moves into engagement with the trailing end flap $F_3$ to at least partially fold and close it prior to engagement with the selected lugs 32 in the actuated position. In the illustrated embodiment, the wheel 86 includes four paddles 88 (each with an optional transversely extending foot), and is thus intermittently rotated one quarter turn to cause the corresponding paddle 88a to advance into engagement with the trailing end flap $F_3$. The rotation may be effected by an onboard motive device, such as a motor. Suitable gearing (not shown) may also be used to ensure that a full or partial turn of the output shaft of the motor effects the desired amount of rotation in the wheel 86 for both folding the trailing end flap $F_3$ and retracting the corresponding paddle 88a from the conveying path.

Figure 5A:
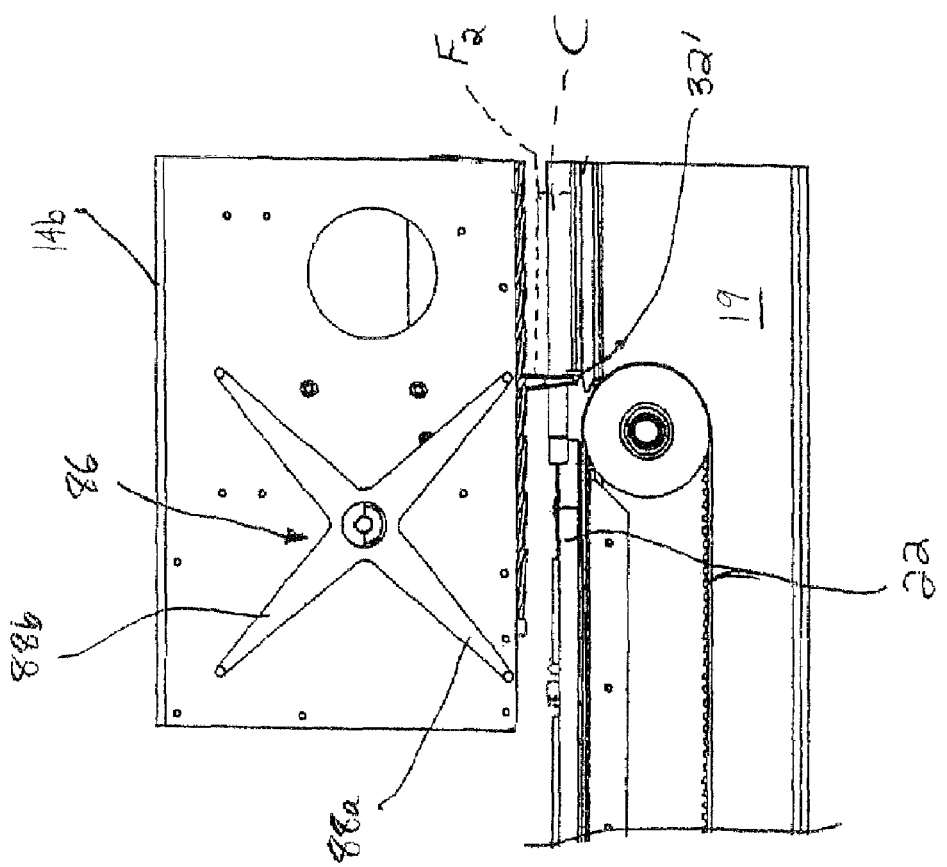
FIGS. 5a-5e are side views of a rotatable star wheel for assisting in folding a trailing edge flap of a carton being conveyed by the machine.
Figure 5B:
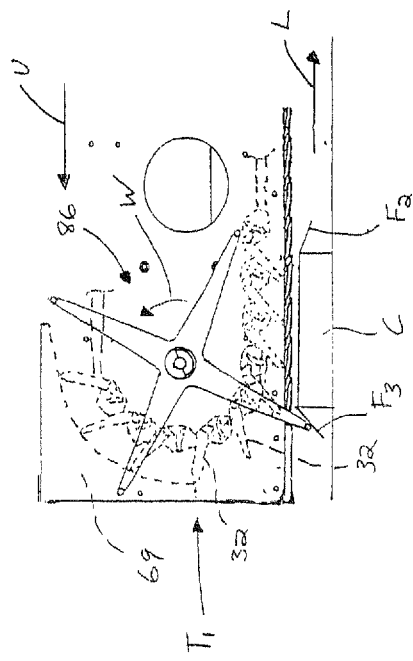
Figure 5C:
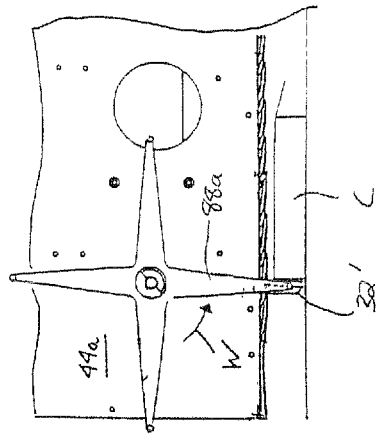

Thus, in another possible mode of operation, as shown in the progressive views of FIGS. 5b-5e, the carton C is introduced to the intermediate conveyor 14 traveling at a generally constant and predictable speed as the result of the belts 22 (which as perhaps best shown in FIG. 5a may extend at least partially beneath the adjacent overhead conveyor 14). As the carton C is conveyed along by the belts 22, the position of the leading end adjacent to the side flap $F_2$ is detected using sensors, and the length in the conveying direction is known from the operator input. Consequently, the moment in time when the trailing end flap $F_3$ is adjacent to the corresponding paddle 88a may be determined by the controller (which receives the output signal from the sensor used to actuate the wheel 86). Preceding or at that instant, the wheel 86 is rotated (note counterclockwise action arrow W) such that the next-in-line paddle 88a sweeps into the conveying path (FIG. 5b) to engage and at least partially fold the trailing end flap $F_3$ (FIG. 5c).

Figure 5D:
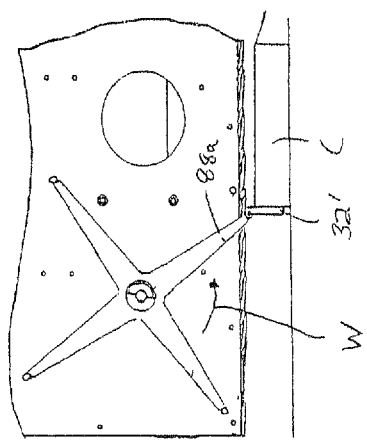

At about the same instant in time, corresponding lugs 32 associated with the lug conveyors 14a, 14b are also selected for actuation by momentarily pivoting the fingers 68 associated with the lug conveyors 14a, 14b. The lugs 32 selected for actuation thus move into the conveying path slightly behind the at least partially folded trailing end flap $F_3$ (FIG. 5b). Preferably, the timing is such that the lugs 32 catch up with the carton C to engage and convey it just as the trailing end flap $F_3$ is partially folded (at which point the conveying influence of the belts 22 is no longer necessary). The lugs 32 may then, and possibly for only a brief instant in time, simultaneously engage the at least partially folded flap $F_3$ with the paddle 88a and convey the carton along (and possibly complete the folding, depending on the timing). Eventually, the carton C advances to a point where the paddle 88a disengages from the trailing end flap $F_3$ (FIG. 5d).

Figure 5E:
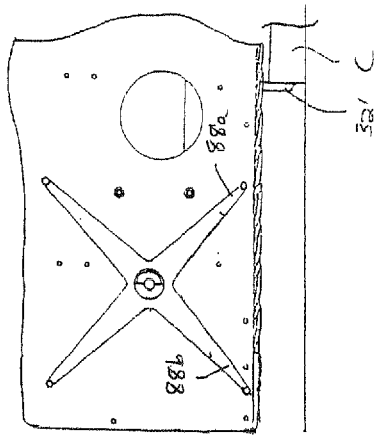

Continued rotation of the pre-folding wheel 86 retracts or withdraws the paddle 88a from the conveying path to a position between the lug conveyors 14a, 14b (FIG. 5e). Simultaneously, the next-in-line paddle 88b moves to a ready position for engaging the trailing end flap $F_3$ on a next-in-line carton. In this particularly preferred embodiment, the combined use of the pre-folding wheel 86 and the selectively actuated, small pitch (overlapping) lugs 32 with the corresponding diverter (finger 68) positioned at the transition $T_1$ advantageously provide for smooth, efficient, and reliable operation, even at high throughput speeds (e.g., 200-300 cartons per minute).

Turning back to FIG. 2, as the carton is conveyed along by the depending lugs 32, the front or "broad" side flap $F_1$ is folded and sealed. In the illustrated embodiment, an adhesive is applied to the sidewall of the carton using a gun 90 or like device positioned adjacent to the conveying path. A stationary plow 92 adjacent to and preferably protruding into the conveying path may engage the underside of this broad side flap $F_1$ as the carton C moves along. Next, a series of downstream compression discs or wheels 96 receive the folded flap $F_1$ and apply gentle pressure. This helps to ensure that the adhesive sets such that a proper seal forms and the lid correctly registers. It should further be appreciated that, during this folding sequence, the engagement between the pushers 60 of the actuated lugs 32' and the trailing end of the carton C (see FIG. 5f) helps to ensure that the lid I or closure remains properly registered. The positions of the adhesive gun 90, plow 92, and compression wheels 96 relative to the conveying path are preferably each vertically adjustable to accommodate cartons having different heights.

Figure 6:
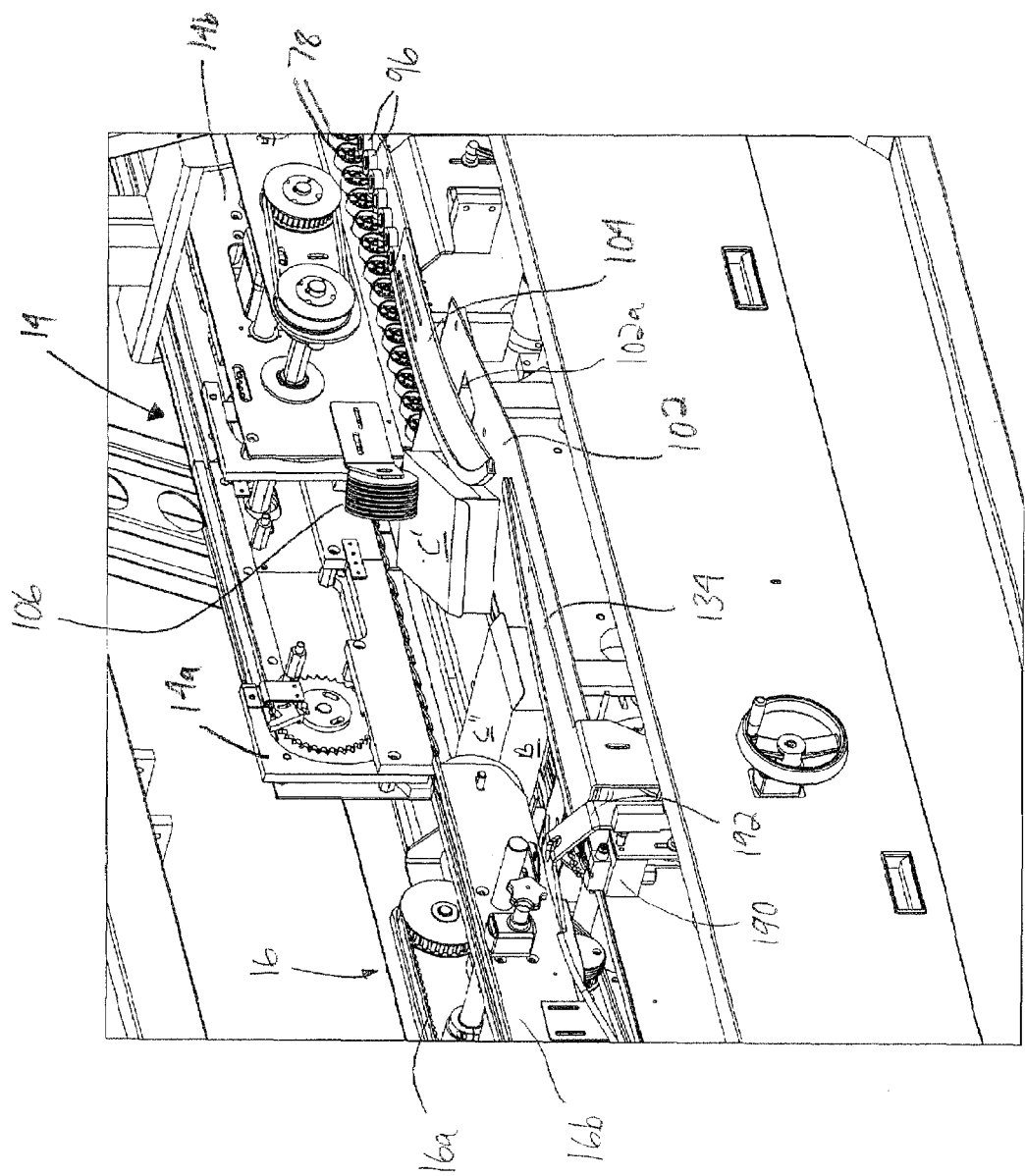
FIG. 6 is an enlarged perspective view of the machine of FIG. 1 showing the turning of a carton from a skewed orientation.

After the broad side flap $F_1$ is folded and sealed, the depending or "pop-down" lugs 32 continue to push the carton along the guide rails or rollers 78 and eventually onto the bed 102 associated with a turn-assist mechanism 100. With reference to FIGS. 1 and 6, it is noted that one of the conveyors 14a, 14b of the intermediate conveyor 14 is somewhat shorter than the other (or, stated another way, conveyor 14b is truncated in the conveying direction). Thus, the associated actuated lug 32' of conveyor 14b may be automatically drawn out of the conveying path in a generally vertical direction as a result of the movement of the corresponding chain in the guide track 36 and the contour of the guide surface 72b at the opposite end of the support member 70. However, the actuated lug 32' of conveyor 14a is not simultanously retracted and thus remains adjacent and in contact with the trailing end adjacent one side of the carton C, thereby tending to still push it onto and along the bed 102 in the conveying direction. Thus, as should be appreciated, at least one of the lug conveyors 14a, 14b, and in the illustrated embodiment the rear one, partially overlies the bed 102 and thus coincides with the turn-assist mechanism 100 in the conveying path.

Figure 5F:
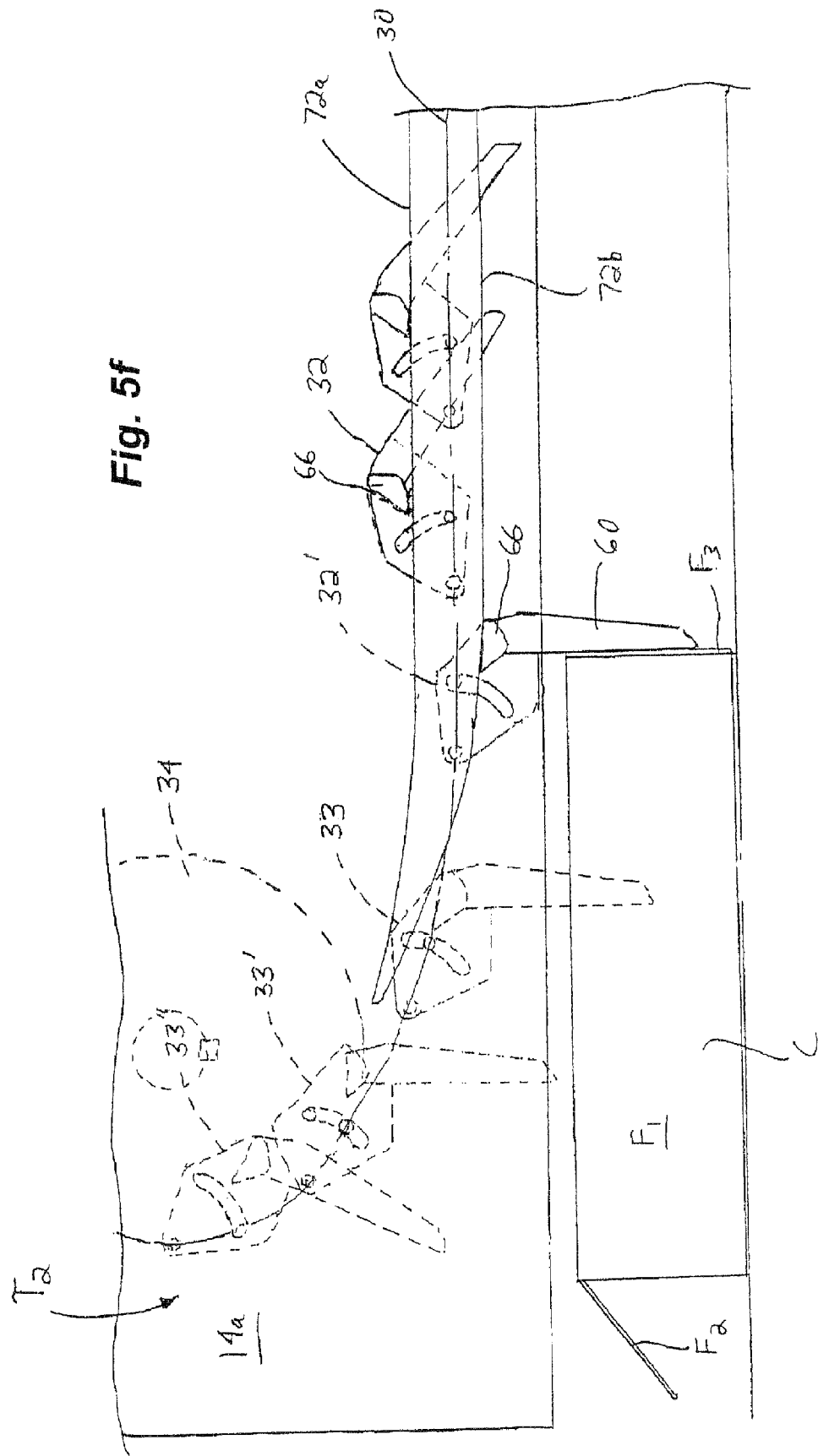
FIG. 5f shows the manner in which an actuated lug may be retracted.

More specifically describing the movement of the actuated lugs 32' at the end of the intermediate conveyor 14 adjacent the bed 102, and with reference to FIG. 5f, the guide structure 72 initially may continue to engage the transverse tab 66 of each lug 32. Toward the downstream end where the transition $T_2$ to the return or upper run U begins, the guide structure 72 also includes a curved or contoured surface 72b for engaging the tab 66. The contour of this surface 72b and the contour of the guide track 36 for the chain 30 are such that the movement to the retracted position is made in a gradual fashion. Consequently, the pusher 60 of the actuated lug 32' remains in a ready position until withdrawn from the conveying path and does not interfere with the orientation of the squared carton (note phantom positions 33 and 33'). In other words, the pusher 60 is withdrawn from the actuated or operative position (corresponding to lug position 32') in a generally vertical direction, at least until it is away from the path of the squared carton.

Also noteworthy is the fact that the withdrawal of the lugs 32 and return to the retracted position are also accomplished in a passive manner. This avoids the need for pivot blocks or like structures that actively engage and "kick back" the actuated lugs. The potential for breakage is thus reduced and the service life increased.

The guide structure 72 ultimately terminates, which allows the corresponding actuated lug 32' to rotate toward the retracted or home position slightly (note position 33"), such that pin 50b engages the upper end of the slot 52. However, as the corresponding chain 30 is driven forward over the sprocket 34 and toward the return/upper run U, the lug 32 is then rotated or pivoted in the opposite direction as the result of the combined centrifugal and gravitational forces acting on it (see FIG. 3). In terms of pivoting movement, the lug 32 ultimately comes to rest in the generally retracted or normal position, and remains in this position as the chain 30 is driven in an endless fashion until it is again selectively actuated by the diverter (e.g., finger 68).

As shown in FIG. 6, the carton C is advanced toward and along the bed 102 while engaged along the trailing end by only a single lug 32 adjacent one side, such as the lug 32' of conveyor 14a. The resulting differential pushing force tends to turn the carton C about a vertical axis from the first orientation in which the broad side or front flap $F_1$ is adjacent the front of the machine 10 to a similar, but skewed orientation. As should be understood, this turning is partly a result of the frictional engagement between the underside surface of the carton C and the upper surface of the bed 102.

Besides turning, the force applied along only one side of the carton C may urge it in the transverse direction. To provide both a guiding function and keep this movement in check during this portion of the feeding sequence, an associated curved guide 104 elongated in the conveying direction N lies adjacent the bed 102. As should be appreciated, this guide 104 may contact the near side of the skewed carton C and generally contain it within the desired path of movement.

Added assurances against undesired "over" rotation and instead ensuring a smooth, controlled turn may be provided by another engagement structure. In the illustrated embodiment, this function is accomplished using friction wheel 106 adjacent and mounted to the distal end of the truncated conveyor 14b, such that a lower portion of the wheel periphery extends into the conveying path of the carton C and makes contact with the folded lid I, as shown in FIGS. 1 and 6, for at least part of the time it is conveyed. This wheel 106 is most preferably made of a high-friction material and arranged so as to rotate passively in a direction oblique to the conveying direction. As should be appreciated, the frictional contact and fixed nature of the wheel 106 help the carton to maintain the initial skew created by the differential pushing along the trailing end.

As this point in the feeding sequence, the carton C is thus partially turned to a skewed orientation (represented by the reference character C in FIGS. 1 and 6) such that the corner closest to the upstream rollers 78 comprises the trailing end. Once this trailing end corner is advanced a sufficient distance along the bed 102, as may be determined based on the known position of the actuated lug 32' of the conveyor 14a still engaging the skewed carton C', the turn-assist mechanism 100 actuates at least one turning lug 110. Actuation of this turning lug 110 causes it to advance through a slightly oversized, transverse opening 102a in the bed 102 over which the carton C just passed to engage a lower portion along the trailing end and complete the turning sequence.

Figure 7:
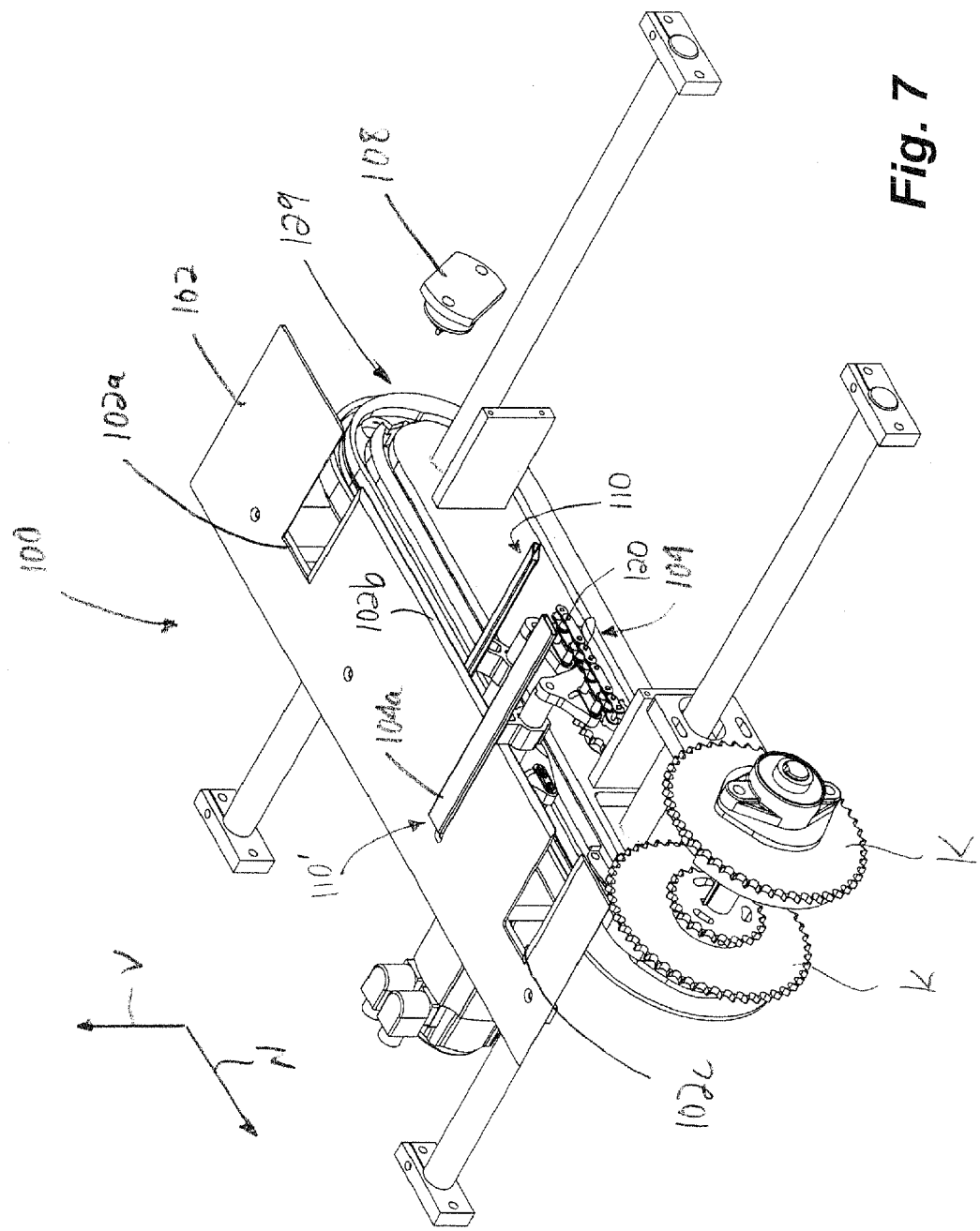
FIG. 7 is a partially cutaway perspective view of the turn-assist mechanism used in FIG. 6.

FIG. 7 illustrates this turning lug 110 with a "pusher" portion for contacting the trailing end of the skewed carton C'. This portion is elongated in a direction transverse to the conveying direction N and vertical direction V for thus squaring the partially turned or skewed carton C', such that the turn through 90° is completed. In the most preferred embodiment, as illustrated, the portion elongated in the transverse direction is the head 112 of the lug 110 that passes through the opening 102a.

Figure 8:
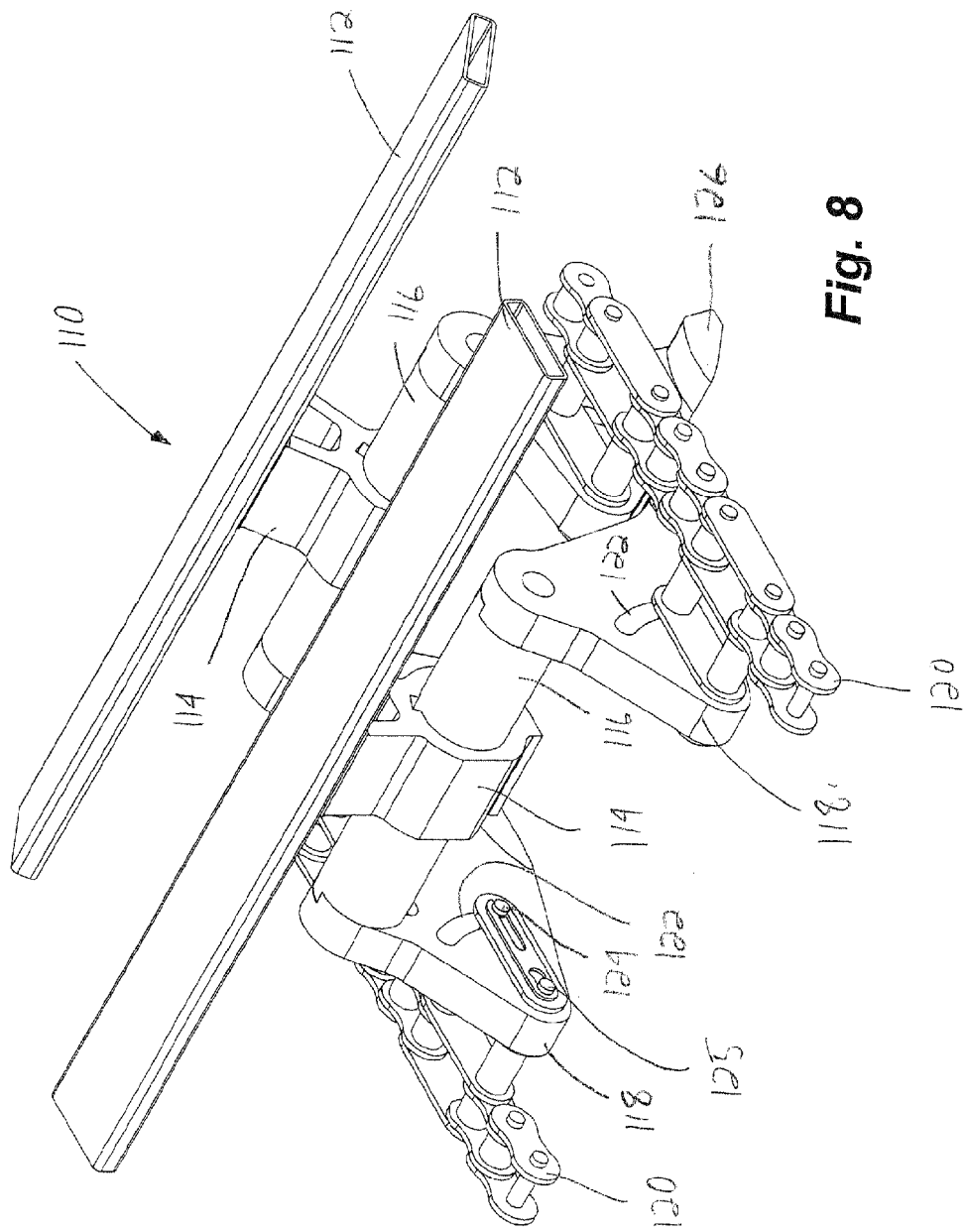
FIG. 8 is a partially cutaway perspective view of the turning lugs associated with the turn-assist mechanism of FIG. 7.

Turning to FIG. 8, the arrangement of the turning lugs 110 is described in more detail. The head 112, which is generally bar-shaped and tubular, fixedly attaches by way of by a connector 114 to a transverse bar 116. The connector 114 is oriented generally perpendicular to the head 112 of the lug 110, thus making it generally T-shaped. This transverse bar 116 in turn fixedly attaches to and spans between two supports 118 pivotally mounted to and carried by corresponding drive chains 120, similar to the manner in which the lugs 32 associated with the intermediate conveyor 14 pivotally attach. Specifically, each support 118 includes a generally curved or arcuate slot 122 for receiving a pin 124 associated with the corresponding chain 120, and an adjacent pivot pin 125 creates the pivot point. For reasons best understood upon reviewing the description that follows, at least one of the supports 118 further includes a transverse projection or tab 126.

Figure 9:
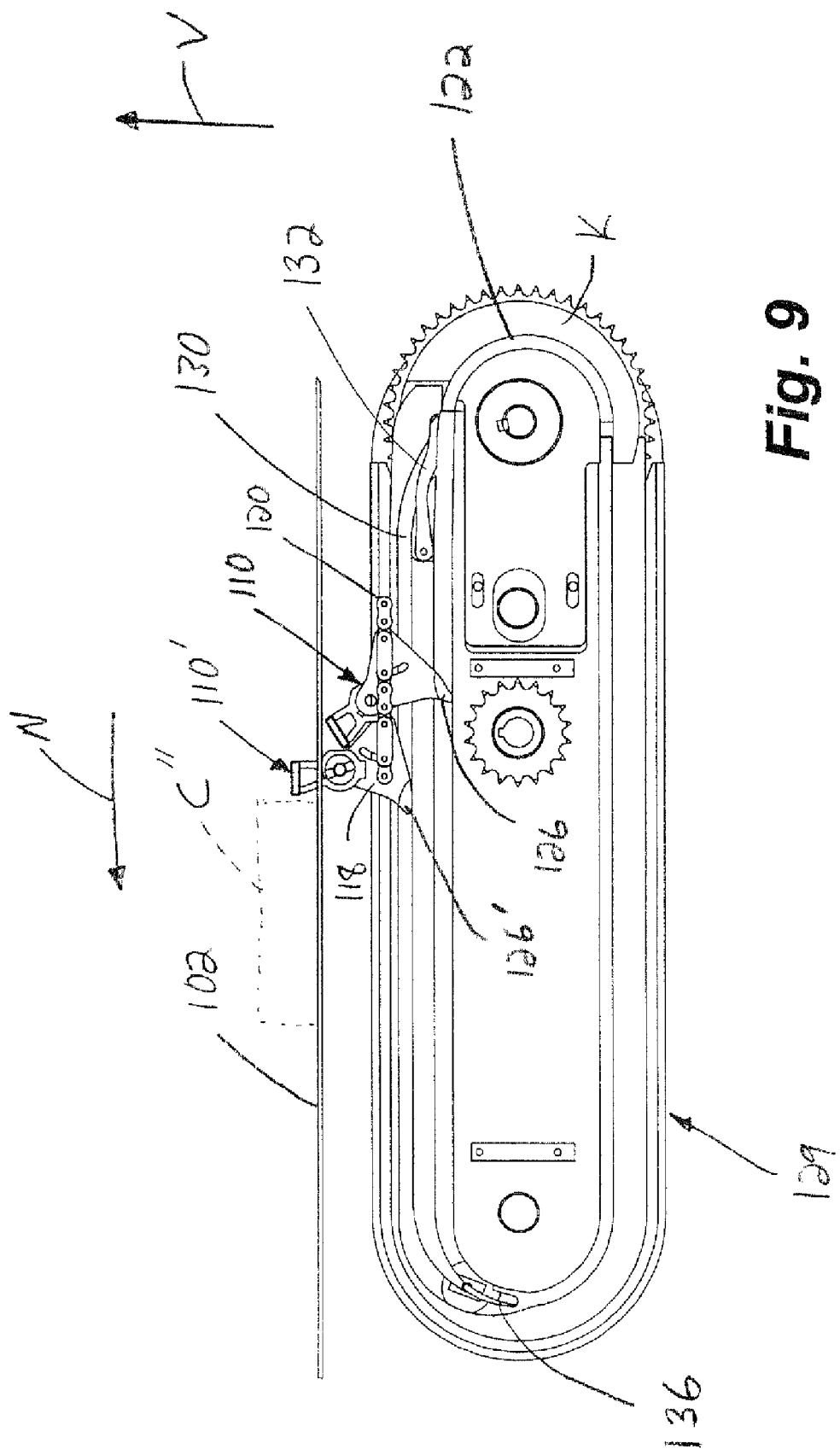
FIG. 9 is a partially cutaway side elevational view of the turn-assist mechanism of FIG. 7.

One manner of using an actuator to selectively move the at least one turning lug 110 into the conveying path for engaging the carton C is shown in FIG. 9. Preferably, a plurality of closely spaced, overlapping turning lugs 110 are conveyed along an endless path via the chains 120. The chains 120 may be driven along and over sprockets K (see FIG. 7) driven by a motor (not shown) at substantially the same speed as the intermediate conveyor 14.

During conveyance, the transverse tabs 126 are normally positioned in a first, lower guide track 128 associated with a guide structure 129. This track 128 corresponds to the non-actuated condition of the lugs 110. At the moment of desired actuation, a diverter or other means for actuating the lug 110, such as an elongated finger 132, is moved (such as by way of a solenoid 108) such that it projects directly into the path of the tab 126 moving through the track 128. The resulting engagement alters the course of travel of the tab 126 to an adjacent upper track 130 corresponding to an actuated condition. During this positional alteration, the lug 110 is caused to pivot toward an upstanding or vertically oriented condition at the precise moment in time such that the head 112 moves through the slightly oversized first opening 102a in the bed 102 to engage the trailing end of the skewed carton C' (see actuated lug 110' in FIG. 9, compared with non-actuated lug, including the transverse tab 126' fully captured in the second/upper guide track 130).

As the chains 120 continue to drive the actuated lug 110', the connector 114 passes through a second opening, such as an elongated slot 102b in the bed 102. The head 112 thus also advances in the conveying direction N to push, turn, and square the skewed carton C' to the new, squared orientation. As shown in FIG. 1, this new or second orientation is one in which the backside B of the carton C becomes the leading end (see FIGS. 1 and 6) and the broadside or front flap $F_1$ is at the trailing end adjacent to the actuated lug 110'. Advantageously, the elongated nature of the transverse head 112 engaging the trailing end carton C along a major portion thereof ensures that the desirable squared second orientation is achieved.

The carton is thus essentially guaranteed to be rotated precisely through 90° without retarding its advance in any way.

The carton C continues being conveyed along the bed 102 in this orientation by the actuated lug 110', with the lug 32' of conveyor 14a ultimately being withdrawn in the manner previously described. The relatively low profile of the head 112 of the lug 110 means that it does not interfere with the ability of the formerly trailing end flap $F_3$ to return to an unfolded condition once contact with the lug 32' ceases (either by way of lateral translation or withdrawal). This lug 110' eventually pushes the reoriented carton C off the bed 102 toward the takeaway conveyor 16. As shown in FIGS. 1 and 6, a second guide 134 elongated in the conveying direction N may be provided adjacent the near side to help maintain the desired orientation of the carton C'' as the transition is made (and preferably at a vertical height such that it does not in any way interfere with the unfolded flap $F_2$; see FIGS. 1 and 6).

Figure 10A:
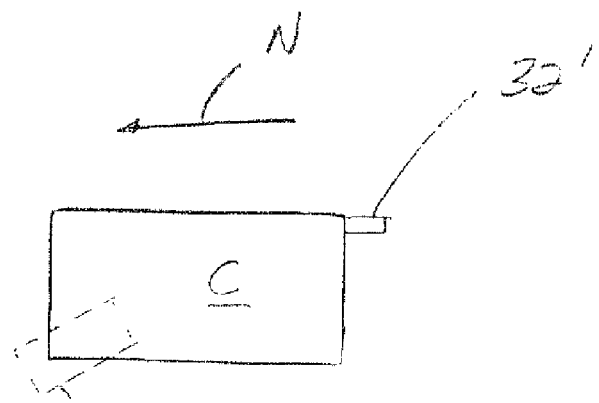
FIGS. 10a-10c are progressive schematic diagrams showing the turning of a carton through 90° using the machine of FIG. 1.
Figure 10B:
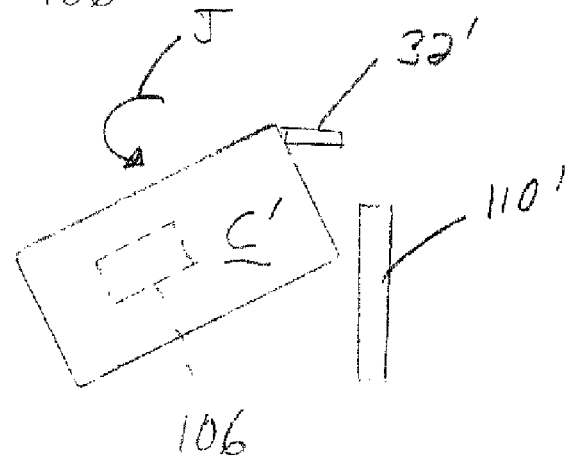
Figure 10C:
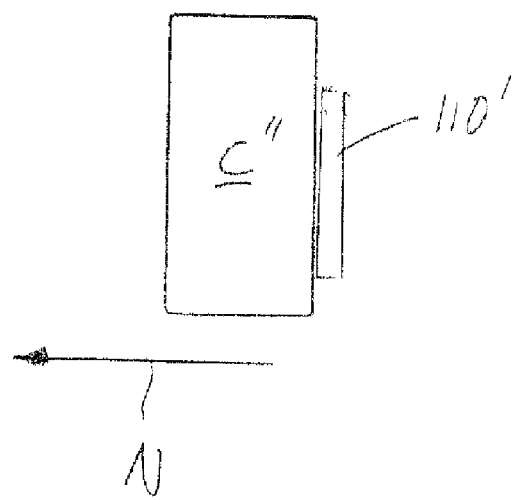

The movement of the partially folded carton C through the entire turning sequence is thus summarized as follows, with reference to the schematic diagrams of FIGS. 10a-10c. FIG. 10a shows the carton C initially the first orientation moving along the conveying direction N with contact along the trailing end by a single actuated lug 32' of conveyor 14a and towards the friction wheel 106. As turning initiates, as shown in FIG. 10b, the friction wheel 106 helps to guide the skewed carton C' while the turner lug 110' actuates from a downstream location. As shown in FIG. 10c, this lug 110' is driven into engagement with the trailing end with the actuated lug 32' retracted so as to turn and square the carton C'' in the second orientation and move it along in the conveying direction N.

Near this end of the bed 102 is a third opening 102c similar to the first opening 102a and associated with the second opening or slot 102b. This second opening 102c is also oversized and receives the head 112 of the actuated lug 110' as it is retracted and after the carton C'' has been successfully turned to the second orientation. With reference to FIG. 9, retraction may occur by way of a second finger 136 actuated to allow the transverse tab 126 to be guided and return to the passive guide track 128. The retracted lug 110 then continues to follow the endless path until it is actuated again by the actuator.

Downstream of the turn-assist mechanism 100, the takeaway conveyor 16 is generally oriented in-line with the intermediate conveyor 14. In one embodiment, the takeaway conveyor comprises two conveyors 16a, 16b including pairs of vertically spaced, generally parallel belts 16a, 16b (see FIG. 2). The belts together engage and convey away the squared carton (that is, with the narrow sides generally parallel to the conveying direction).

During conveyance along the takeaway conveyor 16, any remaining flaps may be folded and sealed. For example, and as perhaps best understood with reference in FIG. 2, an adhesive may be simultaneously applied to each side of the carton C" by a pair of spaced guns 190, and the narrow side flaps $F_2$, $F_3$ then pass a stationary plow 192. The folded side flaps $F_2$, $F_3$ are each engaged by bumpers 194 positioned adjacent to the conveying path. These bumpers 194 are positioned so as to provide a slight compressive force and ensure a proper seal is formed as the adhesive sets. The conveyors 16a, 16b, glue gun 190, plow 192, and bumpers 194 may be supported by mounts that facilitate relative height adjustment so as to ensure that cartons of various heights may be accommodated.

As should be appreciated, the use of selectively actuated lugs 32, 110 allows for the machine 10 in the preferred embodiment to be readily adapted for use with cartons having different lengths in the conveying direction. In the preferred embodiment, the infeed conveyor 12, intermediate conveyor 14, and takeaway conveyors 16 are each independently adjustable to accommodate cartons of varying widths. For example, the intermediate 14 and takeaway conveyors 16 may be provided with means 500 for adjusting the spacing or height of the associated conveyors, such as conveyors 14a, 14b or conveyors 16a, 16b. To avoid the need for adjusting the position of the corresponding motors, the output shafts may be telescopingly connected to the drive shafts associated with the corresponding sprockets via splined interface. Instead of manually operated jack screws, automated linear actuators or ball screws may also be used for adjusting the spacing of the lug conveyors 14a, 14b to accommodate the cartons (in which case the adjustments could also be made automatically based on operator input via touch screen 82). Means, such as handwheels 502 associated with jackscrews, may also be provided for adjusting one or both of the frame members 19 to vary the width of the conveying path.

It is also possible to provide a similar motive device (e.g., linear actuator or jack screw) for adjusting the vertical position of the overhead lug conveyors 14a, 14b relative to the support surface, such as guide rails or rollers 78, to accommodate cartons having increased heights. The range of adjustment in the machine of the preferred embodiment may be limited by the fact that the lugs 32 are of fixed length. To avoid this, it may be possible to use lugs that, in the extended condition, extend through the space provided between the guide rails or rollers 78. A significant height adjustment to the conveyor 14 could then be made.

The foregoing description has been presented for purposes of illustration and description. It is not intended to be exhaustive or to limit the invention to the precise form disclosed. Although the use of static folding structures (e.g., plows and wheels) is preferred for sake of simplicity, the use of other means for folding/sealing is possible. For example, movable devices (e.g., extensible fingers) could be used for folding the side flaps $F_1$, $F_2$, $F_3$ as the carton is conveyed along. Instead of using a glue gun, cartons with pre-applied, heat-activated adhesives or coatings could also be used (in which case the "gun" would instead supply focused, heated air to activate the adhesive or coating in advance of the folding of the corresponding flap). The embodiments described to provide an illustration of the inventive principles and the practical application thereof sufficient to enable one of ordinary skill in the art to utilize them in various other embodiments and with various modifications, as are suited to the particular use contemplated.

The invention claimed is:

1. A machine for conveying a carton in a conveying direction with turning from a first orientation to a second orientation, comprising:
    a first conveyor for at least partially turning the carton from the first orientation to a skewed orientation; and
    a second conveyor including at least one lug having a portion with a direction of elongation transverse to the conveying and vertical directions for engaging a most upstream portion of a trailing end of the carton in the skewed orientation,
    whereby the engagement of the elongated portion with the trailing end helps to turn the carton from the skewed orientation to the second orientation.

2. The machine according to claim 1, wherein the first conveyor includes at least one lug for engaging the trailing end of the carton being conveyed in concert with the at least one lug of the second conveyor.

3. The machine according to claim 1, wherein the first conveyor includes first and second lugs for simultaneously engaging the trailing end of the carton in the first orientation.

4. The machine according to claim 1, wherein the first conveyor comprises a first lug for engaging the trailing end adjacent one side of the carton and a second lug for engaging the trailing end adjacent another side of the carton, including after the first lug withdraws from engagement with the trailing end, whereby the engagement by only the second lug assists in causing the carton to assume the skewed orientation.

5. The machine according to claim 1, wherein the first conveyor comprises adjacent lug conveyors, each having a different length in the conveying direction.

6. The machine according to claim 1, wherein the elongated portion of the lug during actuation to a position for engaging the carton passes through a transverse opening in a bed along which the carton is conveyed.

7. The machine according to claim 6, wherein the lug retracts by passing through a second transverse opening in the bed downstream of the first opening in the conveying direction.

8. The machine according to claim 1, further including a friction wheel for contacting the carton at least partially during the turning from the first orientation to the second orientation.

9. The machine according to claim 1, wherein the lug comprises a generally T-shaped head including the elongated portion.

10. A method for conveying a carton in a conveying direction with turning from a first orientation to a second orientation, comprising:
    at least partially turning the carton from the first orientation to a skewed orientation; and
    turning the carton from the skewed orientation to the second orientation using a first lug having a first portion with a direction of elongation transverse to the conveying and vertical directions by engaging a trailing end of the carton along a major portion thereof with the first portion of the lug.

11. The method of claim 10, wherein the step of at least partially turning the carton from the first orientation to the skewed orientation comprises engaging the carton with at least one lug.

12. The method of claim 10, further including a bed along which the carton passes, and wherein the step of turning the carton from the skewed orientation to the second orientation further includes the step of passing the lug through at least one opening in the bed.

13. The method of claim 10, further including the step of frictionally engaging the carton during the turning from the first orientation to the skewed orientation.

14. The method of claim 10, further including the steps of:
engaging the trailing end adjacent one side of the carton with a second lug;
engaging the trailing end, adjacent another side of the carton with a third lug; and
retracting one of the second or third lugs while advancing the carton with the other lug and in concert with the first lug to turn the carton from the first orientation to the second orientation.

15. The method of claim 10, further including the step of pivoting the at least one lug to an actuated condition prior to engaging the trailing end of the carton.

16. The method of claim 10, wherein the major portion is greater than 50% of the trailing end of the carton.

17. A machine for conveying a carton in a conveying direction with turning from a first orientation to a second orientation, comprising:
a first conveyor for at least partially turning the carton from the first orientation to a skewed orientation; and
a second conveyor including at least one lug having an elongated first portion having a dimension substantially corresponding in the direction of elongation to a dimension of a trailing end of the carton in a direction transverse to the conveying direction;
whereby engagement of the elongated portion with the trailing end helps to turn the carton from the skewed orientation to the second orientation.

18. The machine according to claim 17, wherein the first conveyor includes first and second lugs for simultaneously engaging the trailing end of the carton in the first orientation.

19. The machine according to claim 17, wherein the first conveyor includes at least one lug for engaging the trailing end of the carton being conveyed in concert with the at least one lug of the second conveyor.

20. The machine according to claim 17, wherein the first conveyor comprises a first lug for engaging the trailing end adjacent one side of the carton and a second lug for engaging the trailing end adjacent another side of the carton, including after the first lug withdraws from engagement with the trailing end, whereby the engagement by only the second lug assists in causing the carton to assume the skewed orientation.

21. The machine according to claim 17, wherein the first conveyor comprises adjacent lug conveyors, each having a different length in the conveying direction.

22. The machine according to claim 17, further including an opening in a bed along which the carton is conveyed for receiving a portion of the at least one lug, said opening having a direction of elongation in the transverse direction.

23. The machine according to claim 22, further including a second opening in the bed downstream of the first opening in the conveying direction and elongated in the transverse direction.

24. The machine according to claim 17, further including a friction wheel adapted for contacting the carton at least partially during the turning from the first orientation to the second orientation.

25. The machine according to claim 17, wherein the second conveyor includes at least one endless chain, and the at least one lug includes a second, depending portion connected to the chain.

26. The machine according to claim 17, wherein the lug is generally T-shaped.

27. A machine for conveying a carton in a conveying direction with turning from a first orientation to a second orientation, comprising:
a first conveyor for at least partially turning the carton from the first orientation to a skewed orientation, wherein the first conveyor comprises a first lug for engaging the trailing end adjacent one side of the carton and a second lug for engaging the trailing end adjacent another side of the carton, including after the first lug withdraws from engagement with the trailing end, such that the engagement by the second lug assists in causing the carton to assume the skewed orientation; and
a second conveyor including a third lug having a portion with a direction of elongation transverse to the conveying and vertical directions for engaging a trailing end of the carton in the skewed orientation,
whereby the engagement of the elongated portion of the third lug with the trailing end helps to turn the carton from the skewed orientation to the second orientation.

28. The machine according to claim 27, wherein the third lug retracts by passing through a second transverse opening in the bed downstream of the first opening in the conveying direction.

29. The machine according to claim 27, further including a friction wheel adapted for contacting the carton at least partially during the turning from the first orientation to the second orientation.

* * * * *